(12) United States Patent
Hagiwara

(10) Patent No.: US 11,108,933 B2
(45) Date of Patent: Aug. 31, 2021

(54) COLOR CONVERSION APPARATUS, NON-TRANSITORY COMPUTER READABLE MEDIUM, AND IMAGE FORMING APPARATUS

(71) Applicant: FUJIFILM Business Innovation Corp., Tokyo (JP)

(72) Inventor: Hisashi Hagiwara, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 110 days.

(21) Appl. No.: 16/364,188

(22) Filed: Mar. 26, 2019

(65) Prior Publication Data

US 2019/0306373 A1 Oct. 3, 2019

(30) Foreign Application Priority Data

Apr. 2, 2018 (JP) .............................. JP2018-070916

(51) Int. Cl.
*H04N 1/54* (2006.01)
*G06F 3/0484* (2013.01)

(52) U.S. Cl.
CPC ........... *H04N 1/54* (2013.01); *G06F 3/04842* (2013.01)

(58) Field of Classification Search
CPC ..... H04N 1/54; G06F 3/04842; G06K 15/129
See application file for complete search history.

(56) References Cited

U.S. PATENT DOCUMENTS

2019/0132486 A1* 5/2019 Yamamoto ........... H04N 1/6011

FOREIGN PATENT DOCUMENTS

| JP | 2012-058977 | 3/2012 |
| JP | 2016-103695 | 6/2016 |

* cited by examiner

*Primary Examiner* — Christopher Wait
(74) *Attorney, Agent, or Firm* — JCIPRNET

(57) ABSTRACT

A color conversion apparatus includes an obtaining unit, a defining unit, and an output unit. The obtaining unit obtains information indicating a positional relationship between basic-color toners of basic colors and a special-color toner of a special color among special-color toners of special colors regarding vertical layering on an image formed in an image forming apparatus using the basic-color toners and the special-color toner. The defining unit defines a spot color by a combination of the basic colors and the special color. The output unit outputs, in accordance with the positional relationship indicated by the information, basic-color conversion tables used to convert the spot color to the basic colors that are included in the combination and a special-color conversion table used to convert the spot color to the special color that is included in the combination.

8 Claims, 10 Drawing Sheets

COLOR CONVERSION APPARATUS, NON-TRANSITORY COMPUTER READABLE MEDIUM, AND IMAGE FORMING APPARATUS

CROSS-REFERENCE TO RELATED APPLICATIONS

This application is based on and claims priority under 35 USC 119 from Japanese Patent Application No. 2018-070916 filed Apr. 2, 2018.

BACKGROUND

(i) Technical Field

The present disclosure relates to a color conversion apparatus, a non-transitory computer readable medium, and an image forming apparatus.

(ii) Related Art

As a technique for outputting a spot color by using toners of normal colors, such as cyan, magenta, yellow, and black, and special toners of special colors other than the normal colors, for example, Japanese Unexamined Patent Application Publication No. 2016-103695 discloses an image forming system. In this image forming system, when a user specifies, on a host computer, a color that is to be replaced with a spot color and the user specifies a special toner that is to be layered with the specified color and a positional relationship between normal-color toners and the special toner regarding layering, the image forming system performs rasterization for normal-color separations and rasterization for a special-color separation in an order that is based on the specified positional relationship.

SUMMARY

In a case where a positional relationship between toners of basic colors, namely, cyan, magenta, yellow, and black, and a toner of a special color other than the basic colors regarding vertical layering is specified, the toners being used in image formation, if the positional relationship specified by the user is different from a positional relationship between the basic-color toners and the special-color toner regarding vertical layering in an image forming apparatus, the special-color toner and the basic-color toners are not layered in accordance with the positional relationship specified by the user, and the output spot color might not be a color intended by the user. Accordingly, a case is assumed where, for example, the image forming apparatus is configured so as to allow changing of the positional relationship of the special-color toner relative to the basic-color toners regarding vertical layering. In this case, to avoid a situation where the spot color that is output to a recording medium is not the color intended by the user, the user needs to check the arrangement positions of image forming units that form toner images using the basic-color toners and the arrangement position of an image forming unit that forms a toner image using the special-color toner and to specify a positional relationship between the basic-color toners and the special-color toner regarding vertical layering and a ratio between the basic colors and the special color for representing the spot color using the basic colors and the special color, which takes time and effort.

Aspects of non-limiting embodiments of the present disclosure relate to a technique for enabling output of a spot color as intended even if a positional relationship between the basic-color toners and the special-color toner regarding vertical layering is changed in the image forming apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a color conversion apparatus including an obtaining unit, a defining unit, and an output unit. The obtaining unit obtains information indicating a positional relationship between basic-color toners of basic colors and a special-color toner of a special color among special-color toners of special colors regarding vertical layering on an image formed in an image forming apparatus using the basic-color toners and the special-color toner. The defining unit defines a spot color by a combination of the basic colors and the special color. The output unit outputs, in accordance with the positional relationship indicated by the information, basic-color conversion tables used to convert the spot color to the basic colors that are included in the combination and a special-color conversion table used to convert the spot color to the special color that is included in the combination.

BRIEF DESCRIPTION OF THE DRAWINGS

An exemplary embodiment of the present disclosure will be described in detail based on the following figures, wherein.

DETAILED DESCRIPTION

Exemplary Embodiment

Configuration According to Exemplary Embodiment

Figure 1:
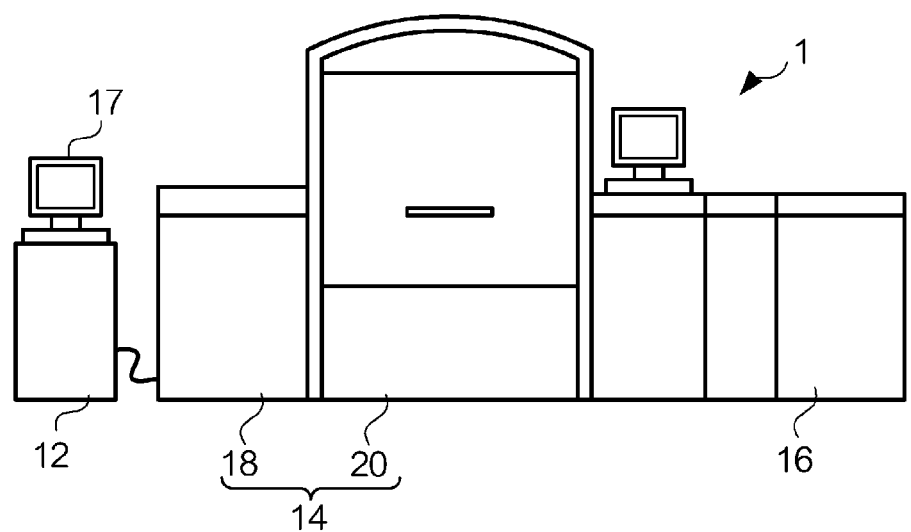
FIG. 1 is a diagram illustrating apparatuses related to an image forming system according to the exemplary embodiment of the present disclosure.

Now, an exemplary embodiment of the present disclosure is described. FIG. 1 is a diagram illustrating apparatuses related to an image forming system 1 according to the exemplary embodiment of the present disclosure. The image forming system 1 includes an image processing apparatus 12, an image forming apparatus 14, and a post-processing apparatus 16. The image processing apparatus 12 feeds raster data that represents an image to be formed on a recording medium to the image forming apparatus 14, and controls the image forming apparatus 14 and the post-processing apparatus 16. The image processing apparatus 12 includes an operation unit 17, and the operation unit 17 accepts various types of input from a user. The image processing apparatus 12 is an example of the color conversion apparatus according to the exemplary embodiment of the present disclosure. The image forming apparatus 14 includes a recording medium feeding part 18 that feeds recording media and an image forming part 20 that forms images on media. The recording medium feeding part 18 feeds, to the image forming part 20, for example, cut sheet paper or continuous paper as recording media. The image forming apparatus 14 is an example of the image forming apparatus according to the exemplary embodiment of the present disclosure.

Figure 2:
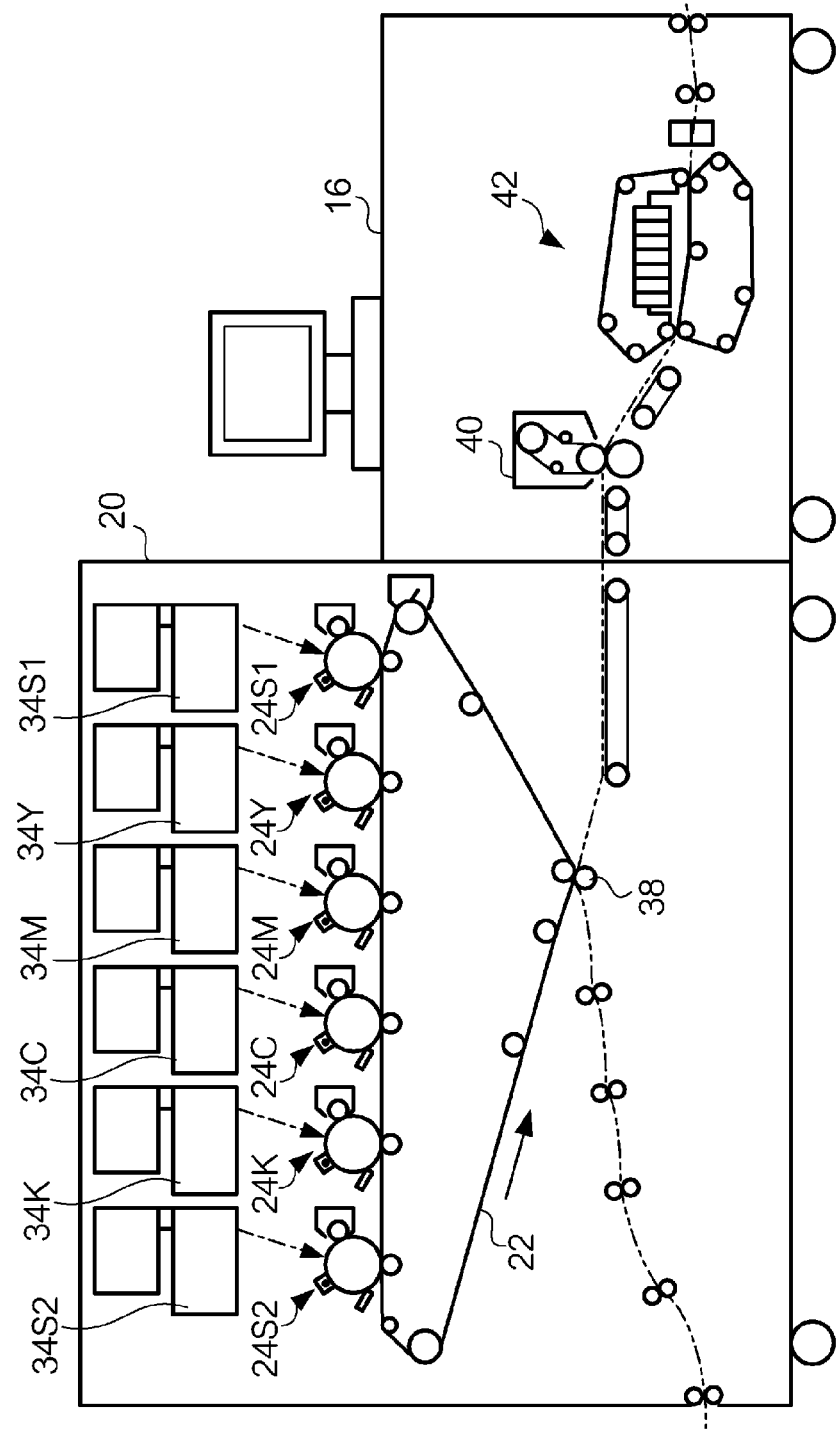
FIG. 2 is a diagram illustrating a configuration of an image forming part.

FIG. 2 is a diagram illustrating a configuration of the image forming part 20. The image forming part 20 includes an intermediate transfer belt 22 to which toner images are transferred. Above the intermediate transfer belt 22, image forming units 24Y, 24M, 24C, 24K, 24S1, and 24S2 that form toner images to be transferred to the intermediate transfer belt 22 are arranged. Above the image forming units 24Y, 24M, 24C, 24K, 24S1, and 24S2, optical scanning devices 34Y, 34M, 34C, 34K, 34S1, and 34S2 are arranged. The image forming units 24Y, 24M, 24C, and 24K are examples of first image forming units according to the exemplary embodiment of the present disclosure, and the image forming units 24S1 and 24S2 are examples of second image forming units according to the exemplary embodiment of the present disclosure.

The optical scanning device 34Y corresponds to the image forming unit 24Y, the optical scanning device 34M corresponds to the image forming unit 24M, the optical scanning device 34C corresponds to the image forming unit 24C, and the optical scanning device 34K corresponds to the image forming unit 24K. The optical scanning device 34S1 corresponds to the image forming unit 24S1, and the optical scanning device 34S2 corresponds to the image forming unit 24S2. The optical scanning devices 34Y, 34M, 34C, 34K, 34S1, and 34S2 have the same configuration except the optical scanning devices 34Y, 34M, 34C, 34K, 34S1, and 34S2 correspond to the different image forming units. Therefore, in a case where the optical scanning devices 34Y, 34M, 34C, 34K, 34S1, and 34S2 need not be distinguished from one another, the optical scanning devices 34Y, 34M, 34C, 34K, 34S1, and 34S2 are referred to as optical scanning devices 34.

Each of the optical scanning devices 34 irradiates a photoreceptor drum included in a corresponding one of the image forming units with a laser beam to form an electrostatic latent image on the photoreceptor drum. Specifically, the optical scanning device 34Y forms an electrostatic latent image in accordance with raster data that represents a yellow separation fed from the image processing apparatus 12, the optical scanning device 34M forms an electrostatic latent image in accordance with raster data that represents a magenta separation fed from the image processing apparatus 12, the optical scanning device 34C forms an electrostatic latent image in accordance with raster data that represents a cyan separation fed from the image processing apparatus 12, and the optical scanning device 34K forms an electrostatic latent image in accordance with raster data that represents a black separation fed from the image processing apparatus 12. The optical scanning device 34S1 forms an electrostatic latent image in accordance with raster data that represents a first-special-color separation fed from the image processing apparatus 12, and the optical scanning device 34S2 forms an electrostatic latent image in accordance with raster data that represents a second-special-color separation fed from the image processing apparatus 12.

The image forming unit 24Y forms a toner image using a yellow toner, the image forming unit 24M forms a toner image using a magenta toner, the image forming unit 24C forms a toner image using a cyan toner, and the image forming unit 24K forms a toner image using a black toner. The yellow, magenta, cyan, and black toners are the basic-color toners according to the exemplary embodiment of the present disclosure. The image forming unit 24S1 forms a toner image using a first-special-color toner, and the image forming unit 24S2 forms a toner image using a second-special-color toner. Examples of the special-color toners include gold, silver, clear, white, and orange toners. These special-color toners are the special-color toners according to the exemplary embodiment of the present disclosure. The image forming units 24Y, 24M, 24C, 24K, 24S1, and 24S2 have the same configuration except the image forming units 24Y, 24M, 24C, 24K, 24S1, and 24S2 use different toners to form toner images. Therefore, in a case where the image forming units 24Y, 24M, 24C, 24K, 24S1, and 24S2 need not be distinguished from one another, the image forming units 24Y, 24M, 24C, 24K, 24S1, 24S2 are referred to as image forming units 24.

In this exemplary embodiment, the image forming units 24 are arranged from the upstream side to the downstream side in the rotation direction of the intermediate transfer belt 22 in the order of the image forming unit 24S1, the image forming unit 24Y, the image forming unit 24M, the image forming unit 24C, the image forming unit 24K, and the image forming unit 24S2. Therefore, toner images that are transferred to the intermediate transfer belt 22 from the image forming units 24 are layered in the order of the toner images of the first special color, yellow, magenta, cyan, black, and the second special color on the intermediate transfer belt 22, and therefore, the toner image of the first special color is the backmost toner image, and the toner image of the second special color is the foremost image. When the toner images are transferred to a recording medium from the intermediate transfer belt 22, the toner images transferred to the recording medium are layered in the order of the toner images of the second special color, black, cyan, magenta, yellow, and the first special color, and therefore, the toner image of the second special color is the backmost toner image, and the toner image of the first special color is the foremost image. A first transfer roll 36 (see FIG. 3), the intermediate transfer belt 22, and a second transfer roll 38 correspond to an example of a transfer unit according to the exemplary embodiment of the present disclosure.

In this exemplary embodiment, the toner used by the image forming unit 24S1 and the toner used by the image forming unit 24S2 may be toners of the same special color. In this case, the image forming unit 24S1 and the image forming unit 24S2 form toner images of the same color. Alternatively, the toner used by the image forming unit 24S1 and the toner used by the image forming unit 24S2 may be toners of different special colors. In this case, the image forming unit 24S1 and the image forming unit 24S2 form toner images of different colors. Further, in this exemplary embodiment, the image forming unit 24S1 and the image forming unit 24S2 are attachable and detachable by an operator. Therefore, a configuration in which the image forming unit 24S1 is not mounted and the image forming unit 24S2 is mounted or a configuration in which the image forming unit 24S1 is mounted and the image forming unit 24S2 is not mounted may be employed.

Figure 3:
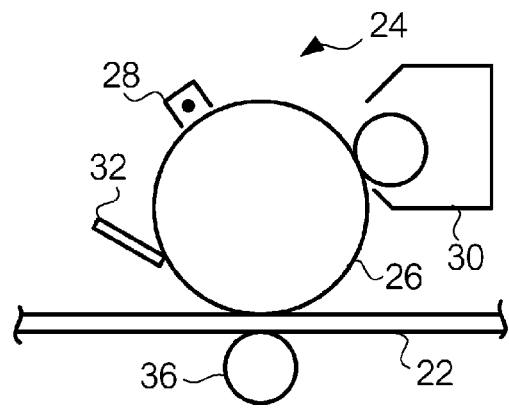
FIG. 3 is a diagram illustrating a configuration of an image forming unit.

FIG. 3 is a diagram illustrating a configuration of the image forming unit 24. The image forming unit 24 is a unit that forms an image using an electrophotographic system, and is constituted by a photoreceptor drum 26, a charging device 28, a developing device 30, and a cleaning device 32. The photoreceptor drum 26 is a cylindrical image retaining body that retains a toner image. The charging device 28 is a device that uniformly charges the surface of the photoreceptor drum 26. The developing device 30 is a device that develops an electrostatic latent image formed on the photoreceptor drum 26. The cleaning device 32 is a device that removes a toner adhered to the photoreceptor drum 26.

In the image forming unit 24, the photoreceptor drum 26 is uniformly charged by the charging device 28 and irradiated with a laser beam emitted from the optical scanning device 34 that corresponds to the image forming unit 24, thereby forming an electrostatic latent image thereon. The electrostatic latent image formed on the photoreceptor drum 26 is developed by using a toner fed from the developing device 30. The first transfer roll 36 is provided at a position so as to face the photoreceptor drum 26 with the intermediate transfer belt 22 therebetween. The toner image developed by the developing device 30 is transferred to the intermediate transfer belt 22 by the first transfer roll 36. After the step of transferring the toner image, the remaining toner, paper dust, and so on adhered to the photoreceptor drum 26 are removed by the cleaning device 32.

The toner image transferred to the intermediate transfer belt 22 from the image forming unit 24 is next transferred to a recording medium fed from the recording medium feeding part 18 by the second transfer roll 38. The recording medium to which the toner image has been transferred is sent to a fixing unit 40, and the toner image is fixed to the recording medium with, for example, heat and pressure. The recording medium to which the toner image has been thus fixed is cooled by a cooling unit 42.

Figure 4:
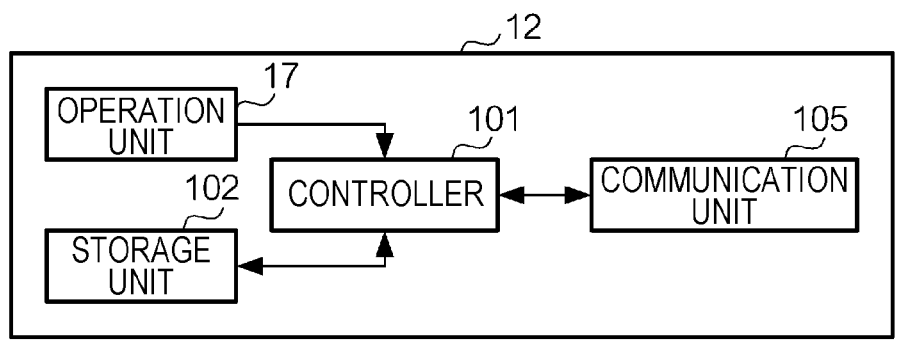
FIG. 4 is a block diagram illustrating a configuration of an image processing apparatus.

Now, the configuration of the image processing apparatus 12 is described. FIG. 4 is a block diagram illustrating an example configuration of the image processing apparatus 12. The operation unit 17 is connected to a controller 101 and includes a display device, a touch panel, and a keyboard. The operation unit 17 displays, on the display device, various screens for operating and setting the image forming system 1 and accepts various types of input and instructions from a user via the touch panel and the keyboard.

A communication unit 105 is a communication interface for data communication and is connected to a network with which data communication is performed and to the controller 101. The communication unit 105 receives document data transmitted from a computer that is connected to the network. The document data is data that represents an image to be formed on a recording medium and is, for example, data described in a page description language. The document data described in a page description language includes an object that is included in the image to be formed and data indicating the color of the object. The communication unit 105 transmits, to the image forming part 20, raster data that is obtained by processing the received document data. The raster data that is fed to the image forming part 20 includes raster data of a yellow separation, raster data of a magenta separation, raster data of a cyan separation, raster data of a black separation, raster data of a first-special-color separation, and raster data of a second-special-color separation.

A storage unit 102 includes a storage device that stores data, and is connected to the controller 101. The storage unit 102 stores a program that is executed by a central processing unit (CPU) included in the controller 101.

The controller 101 includes the CPU and a memory. The functions of the image processing apparatus 12 are implemented in such a manner that the program (software) stored in the storage unit 102 is loaded to a hardware unit, such as the CPU or the memory, and the CPU executes arithmetic operations to control the storage unit 102, the communication unit 105, and reading and/or writing of data from/to the memory and the storage unit 102. In this exemplary embodiment, for example, a function of defining and registering a spot color that is unable to be represented by a combination of the basic colors is implemented. Further, in this exemplary embodiment, a function of generating raster data from document data is implemented.

Figure 5:
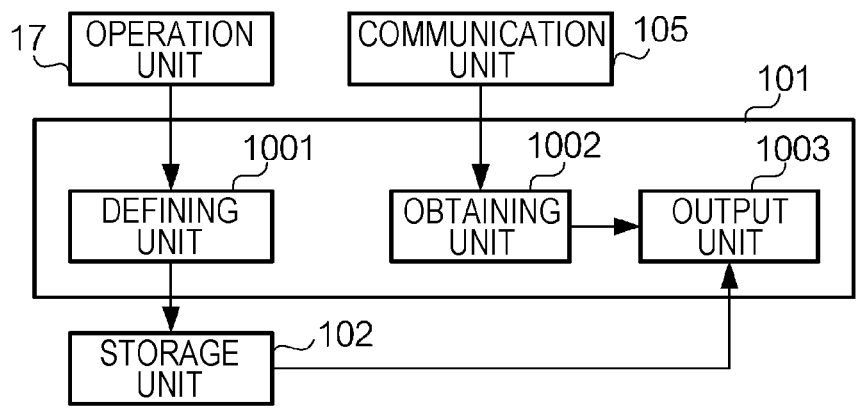
FIG. 5 is a functional block diagram illustrating a functional configuration of the image processing apparatus.

FIG. 5 is a functional block diagram illustrating the configuration of functions related to the exemplary embodiment of the present disclosure among the functions implemented by the controller 101 executing the program. Some or all of the functions may be implemented as hardware.

An obtaining unit 1002 obtains information indicating a positional relationship between the basic-color toners and a special-color toner regarding vertical layering on an image formed in the image forming apparatus 14 using the basic-color toners and the special-color toner. The obtaining unit 1002 is an example of the obtaining unit according to the exemplary embodiment of the present disclosure.

A defining unit 1001 defines a spot color by a combination of the basic colors and the special color in accordance with an operation performed by an operator. The defining unit 1001 is an example of the defining unit according to the exemplary embodiment of the present disclosure.

An output unit 1003 outputs, in accordance with the positional relationship indicated by the information obtained by the obtaining unit 1002, look-up tables used to convert the spot color to the basic colors that are included in the combination defined when the spot color is defined and a look-up table used to convert the spot color to the special color that is included in the combination defined when the spot color is defined. The output unit 1003 is an example of the output unit according to the exemplary embodiment of the present disclosure.

Example Operation According to Exemplary Embodiment

Now, an example operation according to this exemplary embodiment is described. First, an example operation that is performed when a spot color is defined and registered in the image processing apparatus 12 is described. When an operator performs, on the operation unit 17, an operation to give an instruction for displaying a screen for defining a spot color, the image processing apparatus 12 displays a definition screen 70 for defining a spot color on the display device of the operation unit 17.

Figure 6:
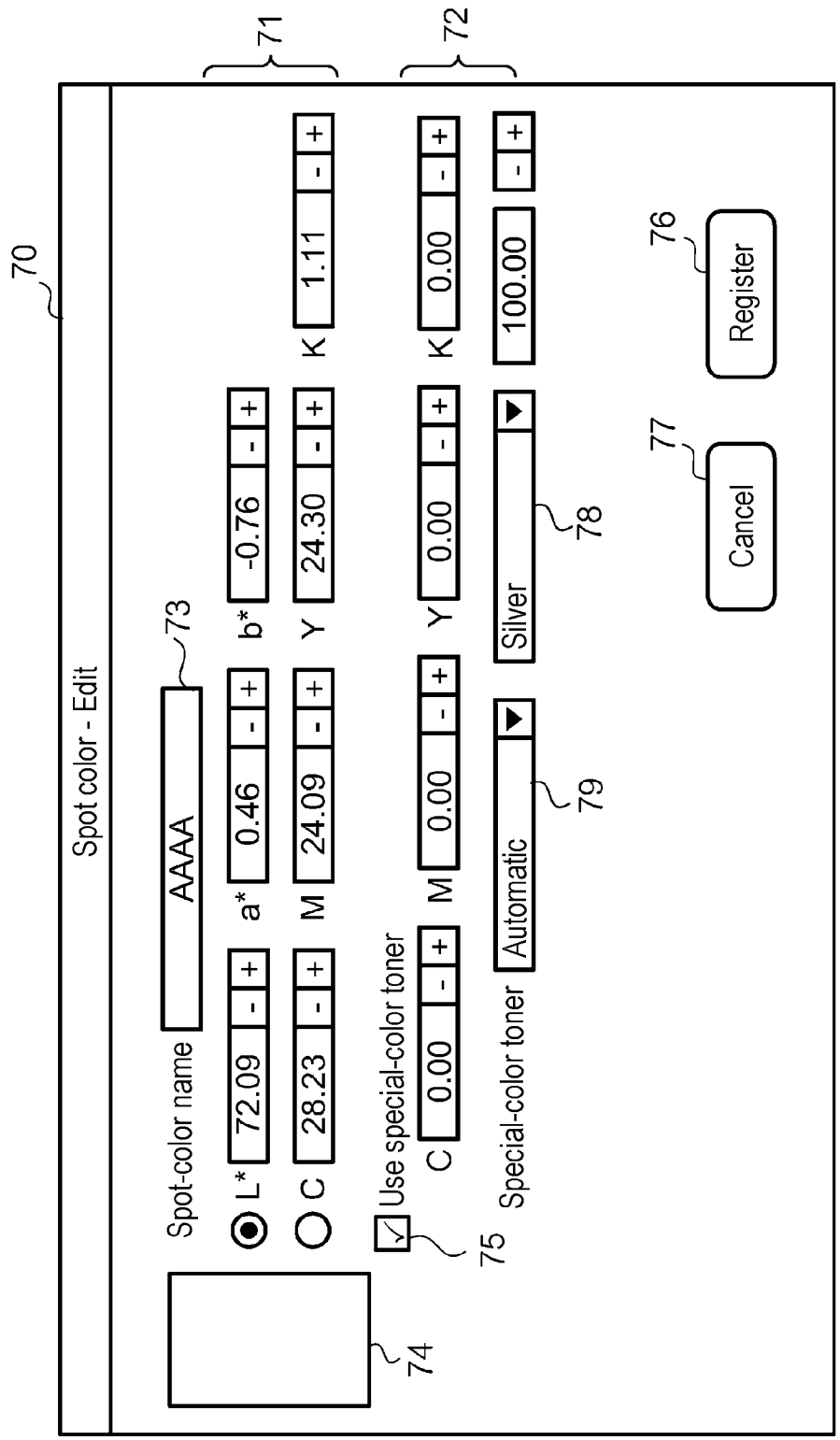
FIG. 6 is a diagram illustrating an example of a definition screen for defining a spot color.

FIG. 6 is a diagram illustrating an example of the definition screen 70. The definition screen 70 includes a name input section 73 for inputting the name of a spot color that is defined by the operator. The name that is input to the name input section 73 may be a name given by a supplier that supplies a color sample or a name given by the operator as desired.

A first definition section 71 is a user interface for defining the spot color by L*a*b* values in the Lab color space or CMYK values in the CMYK color space. In the first definition section 71, selection buttons for selecting either L*a*b* values or CMYK values are included. The L*a*b* values are values ranging from −100 to +100, and the CMYK values are values ranging from 0 to 100% for the respective colors of C (cyan), M (magenta), Y (yellow), and K (black). Next to each of the fields for L*a*b* values and CMYK values, a "+" button and a "−" button for increasing and decreasing the corresponding value are arranged. The operator operates these buttons to change the values.

A second definition section 72 is a user interface for defining the spot color by using special colors that are the colors of the toners used by the image forming units 24S1 and 24S2. When the operator checks a checkbox 75 "use special-color toner", the operator is allowed to define the spot color by using the basic colors and the special colors.

In the second definition section 72, the spot color is defined by CMYK values (from 0 to 100%) in the CMYK color space, the arrangement position of a special-color toner to be used, a special-color-toner type, and a special-color value (from 0 to 100%). The CMYK values and the special-color value are each changed by the operator operating the "+" button and the "−" button for increasing and decreasing the value. The special-color-toner type is selected from among predetermined special-color types by the operator operating a combo box 78. As the special-color types, for example, gold, silver, clear, white, and orange are specified in advance. The arrangement position of the special-color toner is selected from among three options of "backmost", "foremost", and "automatic" by the operator operating a combo box 79. In a case where the arrangement position is set to "backmost", when the spot color is printed by using the basic colors and the special color, a toner of the color set as the special-color-toner type is the backmost toner on a recording medium. In a case where the arrangement position is set to "foremost", when the spot color is printed by using the basic colors and the special color, a toner of the color set as the special-color-toner type is the foremost toner on a recording medium.

The definition screen 70 further includes a spot-color display section 74. In the spot-color display section 74, the spot color defined in the first definition section 71 or the second definition section 72 is displayed. Specifically, in a case where the checkbox 75 is not checked, the L*a*b* values or the CMYK values set in the first definition section 71 are converted to RGB values, and a resulting color is displayed in the spot-color display section 74. In a case where the checkbox 75 is checked, the CMYK values and the special-color value set in the second definition section 72 are separately converted to RGB values, the separately obtained RGB values are combined, and a resulting color is displayed in the spot-color display section 74.

The definition screen 70 further includes a register button 76 and a cancel button 77. When an operation of clicking the register button 76 is performed, the controller 101 registers the settings specified on the definition screen 70 in the storage unit 102. When an operation of clicking the cancel button 77 is performed, the controller 101 does not register the settings specified on the definition screen 70 in the storage unit 102.

For example, in a case where the checkbox 75 is checked, the controller 101 (defining unit 1001) registers, as spot-color data, information indicating that a special-color toner is used as well as the CMYK values, the arrangement position of the special-color toner, the special-color-toner type, and the special-color value set in the second definition section 72 in the storage unit 102 in association with the name input to the name input section 73. As a result of this registration, the spot color is defined. In a case where the checkbox 75 is not checked, the controller 101 registers, as spot-color data, information indicating that no special-color toner is used as well as the L*a*b* values or the CMYK values set in the first definition section 71 in the storage unit 102 in association with the name input to the name input section 73.

Figure 7:
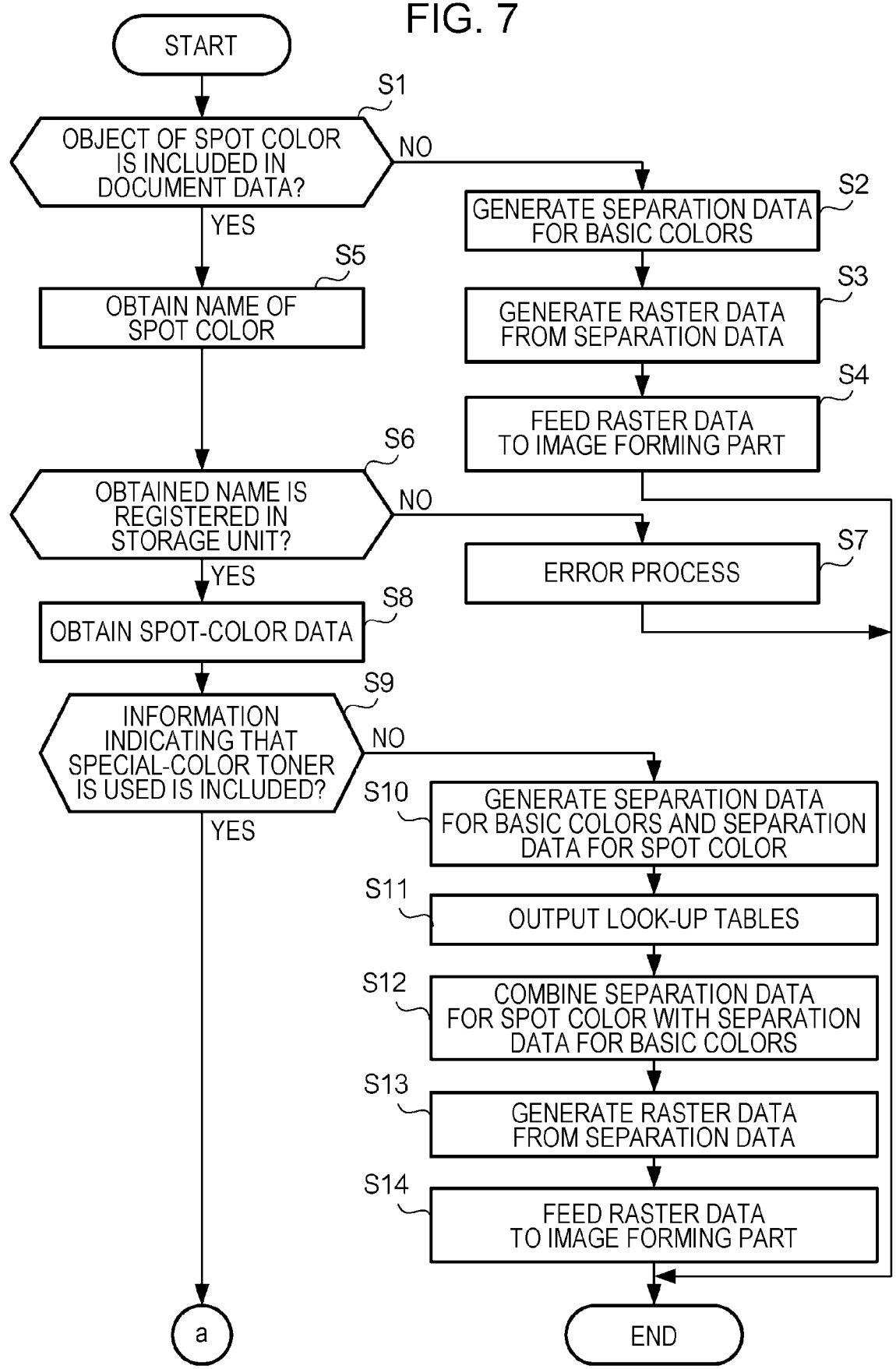
FIG. 7 is a flowchart illustrating a flow of a process that is performed by a controller.
Figure 8:
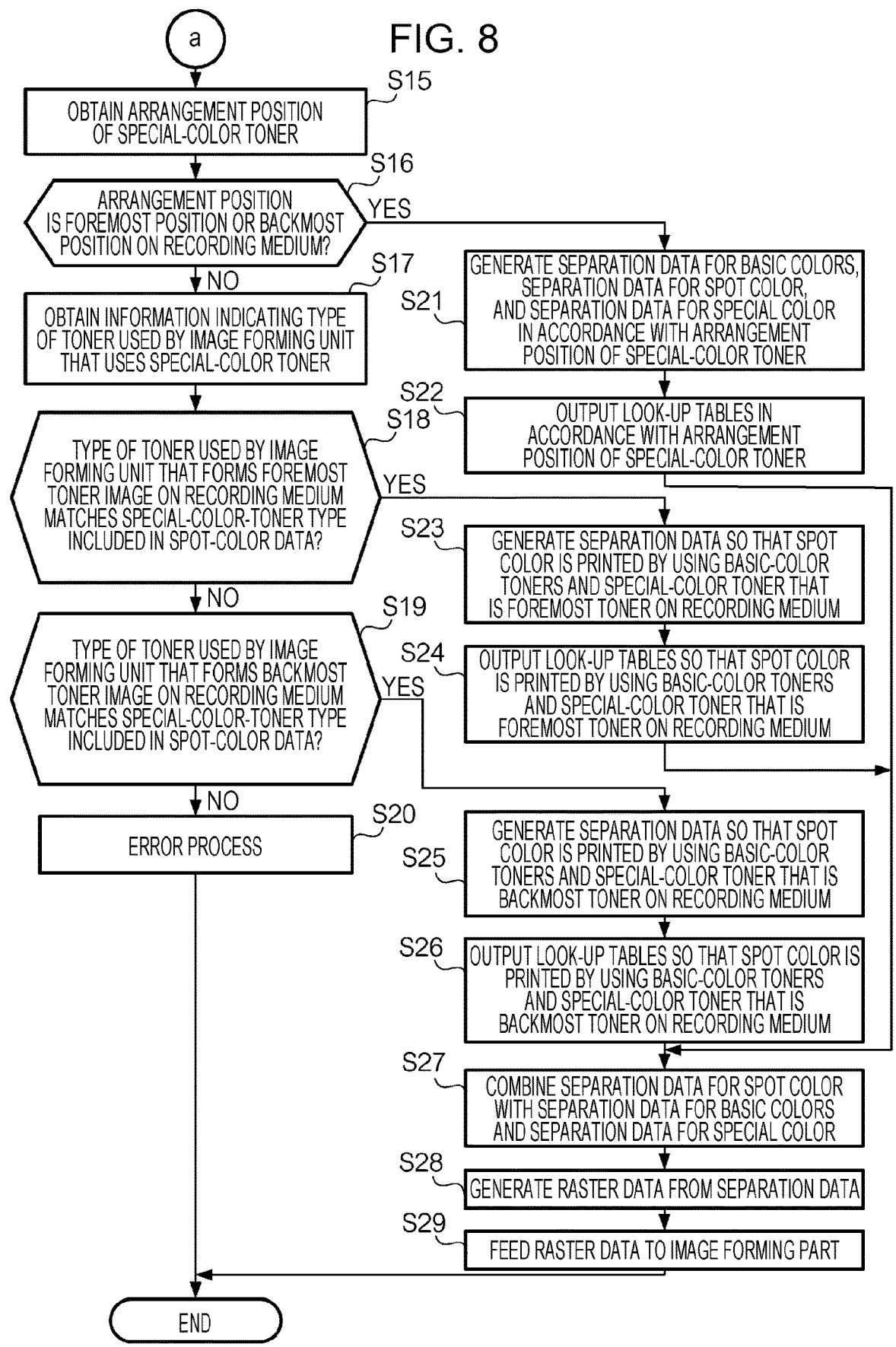
FIG. 8 is a flowchart illustrating a flow of a process that is performed by the controller.

Next, an example operation that is performed to generate raster data from document data received by the communication unit 105 is described with reference to the flowcharts illustrated in FIG. 7 and FIG. 8. The controller 101 determines whether an object of a spot color is included in document data received by the communication unit 105 (step S1). The object is, for example, text, a figure, or a photograph.

In a case where an object of a spot color is not included in the document data received by the communication unit 105 (NO in step S1), the controller 101 performs a separation process to generate separation data that represents an image to be formed by the image forming part 20 for each of the basic colors of yellow, magenta, cyan, and black from the document data (step S2). Next, the controller 101 generates raster data that represents a raster image from the separation data generated for each color (step S3). Here, the controller 101 generates raster data for yellow from the separation data for yellow, generates raster data for magenta from the separation data for magenta, generates raster data for cyan from the separation data for cyan, and generates raster data for black from the separation data for black. The controller 101 feeds the generated pieces of raster data to the image forming part 20 (step S4).

In a case where an object of a spot color is included in an image that is represented by the document data received by the communication unit 105 (YES in step S1), the controller 101 obtains the name of the spot color used for the included object from the document data (step S5) and determines whether the obtained name is registered in the storage unit 102 (step S6). In a case where the obtained name is not registered in the storage unit 102 (NO in step S6), the controller 101 performs an error process (step S7). The error process is a process for, for example, displaying, on the display device of the operation unit 17, the fact that the spot color included in the document data is not defined.

In a case where the name of the spot color used for the object is registered in the storage unit 102 (YES in step S6), the controller 101 obtains spot-color data registered in the storage unit 102 in association with the obtained name (step S8).

Figure 9:
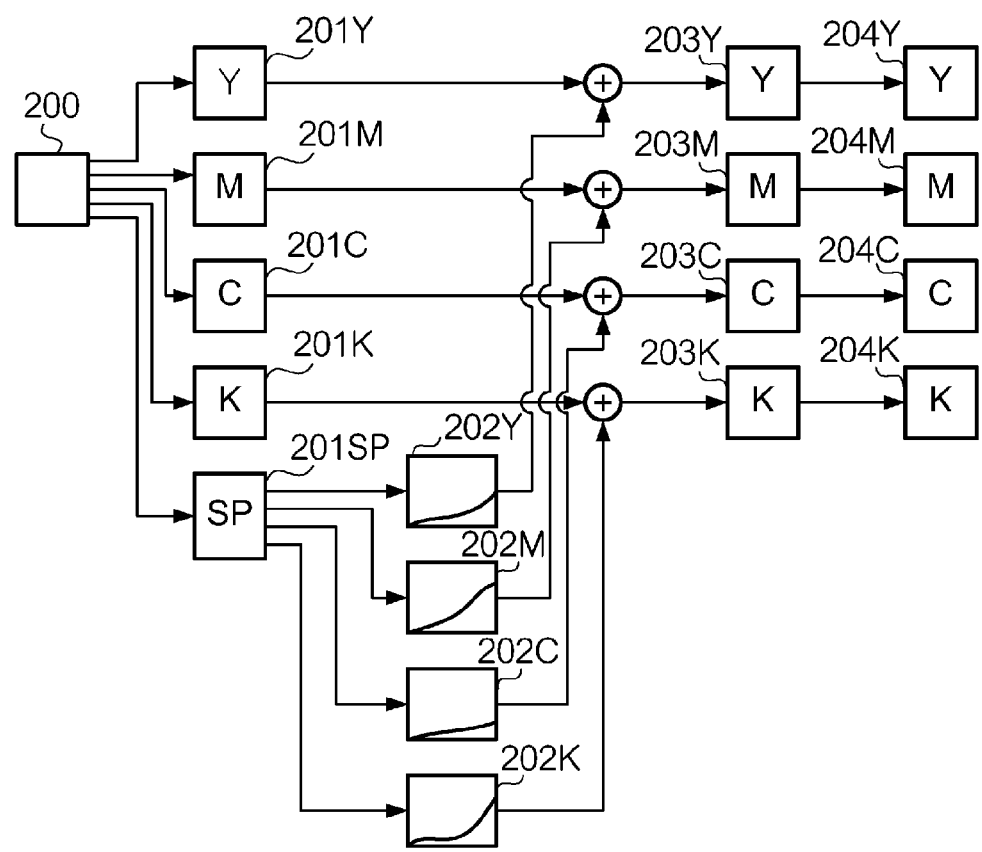
FIG. 9 is a diagram for describing an example operation according to the exemplary embodiment.

The controller 101 determines whether the obtained spot-color data includes information indicating that a special-color toner is used (step S9). In a case where the obtained spot-color data does not include information indicating that a special-color toner is used (NO in step S9), the controller 101 performs a separation process to generate separation data for each of the basic colors of yellow, magenta, cyan, and black and separation data for the spot color (step S10). Specifically, as illustrated in FIG. 9, the controller 101 generates, from document data 200, separation data 201Y for a yellow separation, separation data 201M for a magenta separation, separation data 201C for a cyan separation, separation data 201K for a black separation, and separation data 201SP for a spot-color separation. Here, in a case where an area (pixels) for which the spot color is used is specified to be knocked out, the pixel values in the separation data for each of the basic colors for the area are zero. In a case where the area is specified to be over-printed, the pixel values in the separation data for each of the basic colors for the area are pixel values that represent the background color.

Next, the controller 101 outputs look-up tables for combining the separation data for the spot color with the pieces of separation data for the basic colors by using L*a*b* values or CMYK values included in the obtained spot-color data (step S11). Specifically, as illustrated in FIG. 9, the controller 101 outputs a look-up table 202Y for combining the separation data 201SP for the spot color with the separation data 201Y for yellow, a look-up table 202M for combining the separation data 201SP for the spot color with the separation data 201M for magenta, a look-up table 202C for combining the separation data 201SP for the spot color with the separation data 201C for cyan, and a look-up table 202K for combining the separation data 201SP for the spot color with the separation data 201K for black. In these look-up tables, for example, the horizontal axis represents the pixel value of a pixel of the spot color, and the vertical axis represents a value to be added to the pixel value of a pixel in the separation data to be combined. The look-up tables for combining the separation data for the spot color with the pieces of separation data for the basic colors are examples of the basic-color conversion tables according to the exemplary embodiment of the present disclosure.

Next, the controller 101 performs a process for combining the separation data 201SP for the spot color with each of the pieces of separation data 201Y, 201M, 201C, and 201K for the basic colors (step S12).

Specifically, the controller 101 obtains a value to be added to the pixel value of a pixel of yellow in the separation data 201Y by referring to the look-up table 202Y while using the pixel value of a pixel of the spot color in the separation data 201SP and adds the obtained value to the pixel value of a pixel of yellow in the separation data 201Y.

The controller 101 obtains a value to be added to the pixel value of a pixel of magenta in the separation data 201M by referring to the look-up table 202M while using the pixel value of a pixel of the spot color in the separation data 201SP and adds the obtained value to the pixel value of a pixel of magenta in the separation data 201M.

The controller 101 obtains a value to be added to the pixel value of a pixel of cyan in the separation data 201C by referring to the look-up table 202C while using the pixel value of a pixel of the spot color in the separation data 201SP and adds the obtained value to the pixel value of a pixel of cyan in the separation data 201C.

The controller 101 obtains a value to be added to the pixel value of a pixel of black in the separation data 201K by referring to the look-up table 202K while using the pixel value of a pixel of the spot color in the separation data 201SP and adds the obtained value to the pixel value of a pixel of black in the separation data 201K.

When the controller 101 adds the value obtained from each of the look-up tables to the pixel value of each pixel in a corresponding one of the pieces of separation data for yellow, magenta, cyan, and black, the separation data for the spot color is combined with each of the pieces of separation data for the basic colors, and separation data 203Y for yellow, separation data 203M for magenta, separation data 203C for cyan, and separation data 203K for black used to draw the object of the spot color using the basic colors are generated.

Next, the controller 101 generates pieces of raster data for the basic colors from the pieces of separation data 203Y, 203M, 203C, and 203K for the basic colors (step S13). Specifically, the controller 101 generates raster data 204Y for yellow from the separation data 203Y, generates raster data 204M for magenta from the separation data 203M, generates raster data 204C for cyan from the separation data 203C, and generates raster data 204K for black from the separation data 203K. After completing generation of the pieces of raster data, the controller 101 feeds the generated pieces of raster data to the image forming part 20 (step S14).

In a case where the obtained spot-color data includes information indicating that a special-color toner is used (YES in step S9), the controller 101 obtains the arrangement position of the special-color toner from the obtained spot-color data (step S15). Next, the controller 101 determines whether the arrangement position of the special-color toner is the foremost position or the backmost position on a recording medium from the arrangement position obtained in step S15 (step S16). In a case where the arrangement position of the special-color toner is the foremost position or the backmost position, determination performed by the controller 101 results in YES in step S16.

In the case where determination in step S16 results in YES, the controller 101 generates separation data for each of the basic colors (yellow, magenta, cyan, and black), separation data for the special color, and separation data for the spot color in accordance with the arrangement position of the special-color toner (step S21).

Figure 10:
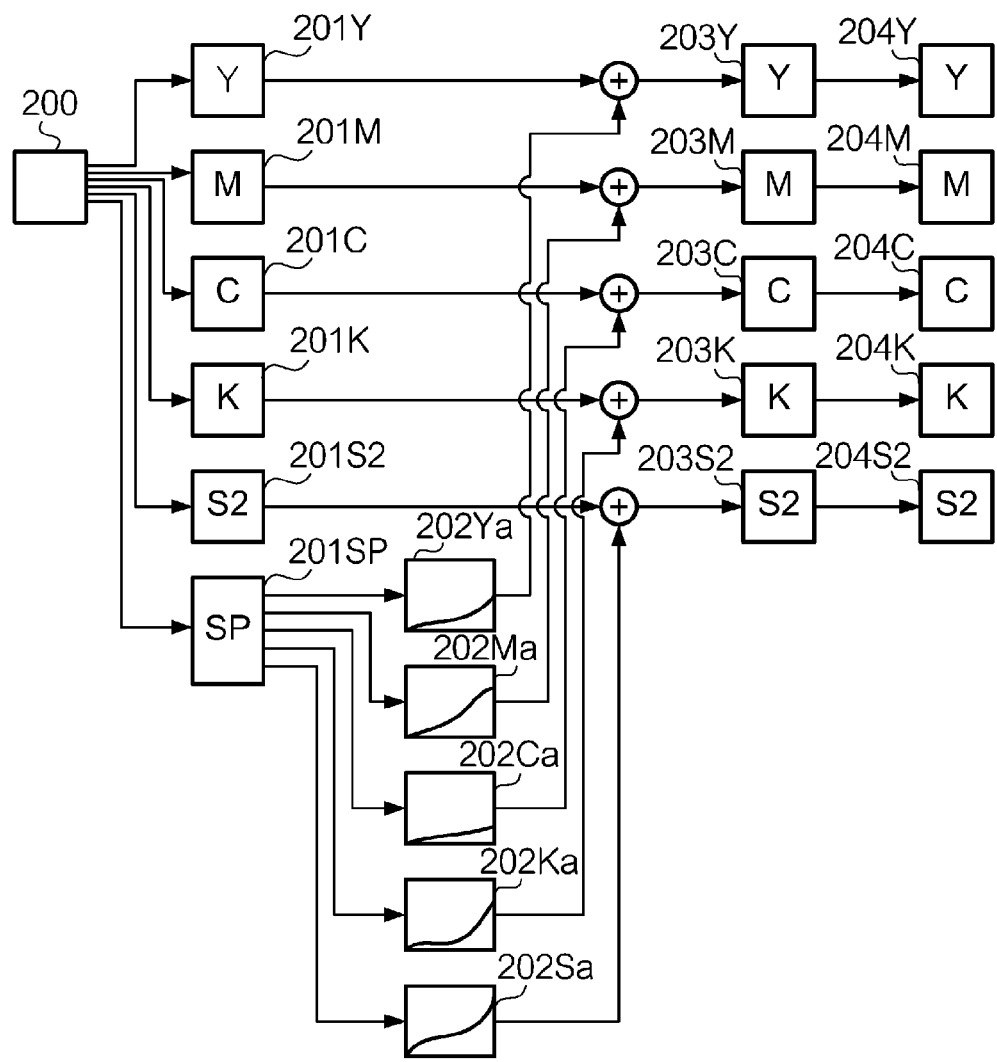
FIG. 10 is a diagram for describing an example operation according to the exemplary embodiment.

Here, in a case where the arrangement position of the special-color toner obtained from the spot-color data is the backmost position on a recording medium, the controller 101 generates, from the document data 200, separation data 201S2 for the special color used by the image forming unit 24S2 that forms the backmost toner image on a recording medium, the separation data 201Y for a yellow separation, the separation data 201M for a magenta separation, the separation data 201C for a cyan separation, the separation data 201K for a black separation, and the separation data 201SP for a spot-color separation, as illustrated in FIG. 10. Here, in the case where an area (pixels) for which the spot color is used is specified to be knocked out, the pixel values in the separation data for each of the basic colors for the area are zero. In the case where the area is specified to be over-printed, the pixel values in the separation data for each of the basic colors for the area are pixel values that represent the background color. In a case where the spot color matches the special color, recording with the spot color is possible, and therefore, the pixel values in the separation data 201S2 for a special-color separation reflect the pixel value of the spot color. On the other hand, in a case where the spot color does not match the special color, the spot color needs to be reproduced by using the special color and the basic colors. In this case, the pixel values in the separation data 201S2 for a special-color separation are zero.

Figure 11:
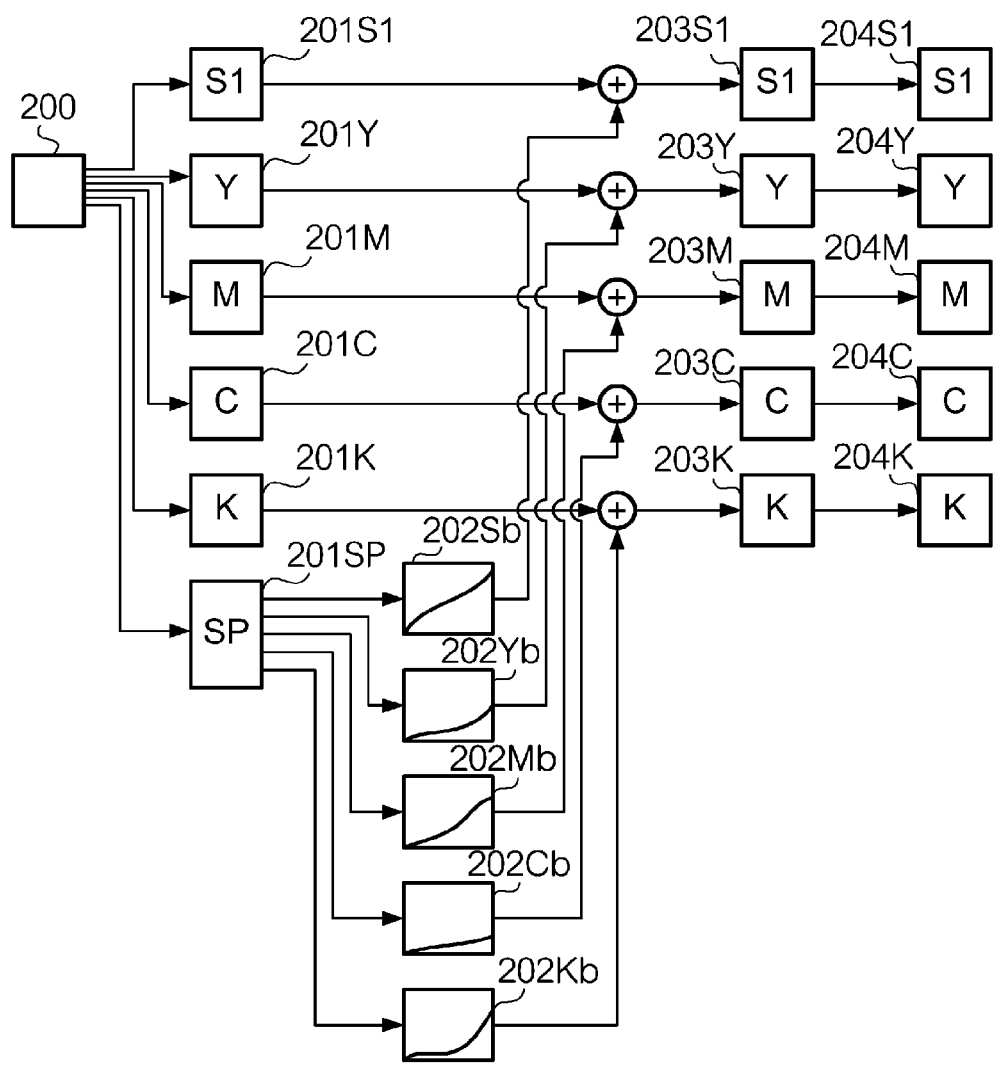
FIG. 11 is a diagram for describing an example operation according to the exemplary embodiment.

On the other hand, in a case where the arrangement position of the special-color toner obtained from the spot-color data is the foremost position on a recording medium, the controller 101 generates, from the document data 200, separation data 201S1 for the special color used by the image forming unit 24S1 that forms the foremost toner image on a recording medium, the separation data 201Y for a yellow separation, the separation data 201M for a magenta separation, the separation data 201C for a cyan separation, the separation data 201K for a black separation, and the separation data 201SP for a spot-color separation, as illustrated in FIG. 11. Here, in the case where an area (pixels) for which the spot color is used is specified to be knocked out, the pixel values in the separation data for each of the basic colors for the area are zero. In the case where the area is specified to be over-printed, the pixel values in the separation data for each of the basic colors for the area are pixel values that represent the background color. In the case where the spot color matches the special color, recording with the spot color is possible, and therefore, the pixel values in the separation data 201S1 for a special-color separation reflect the pixel value of the spot color. On the other hand, in the case where the spot color does not match the special color, the spot color needs to be reproduced by using the special color and the basic colors. In this case, the pixel values in the separation data 201S1 for a special-color separation are zero.

Next, the controller 101 outputs, in accordance with the arrangement position of the special-color toner obtained from the spot-color data, look-up tables for combining the separation data for the spot color with the pieces of separation data for the basic colors and the separation data for the special color by using CMYK values included in the obtained spot-color data (step S22).

Here, in the case where the arrangement position of the special-color toner obtained from the spot-color data is the backmost position, the controller 101 outputs a look-up table 202Sa for combining the separation data 201SP for the spot color with the separation data 201S2 for the special color, a look-up table 202Ya for combining the separation data 201SP for the spot color with the separation data 201Y for yellow, a look-up table 202Ma for combining the separation data 201SP for the spot color with the separation data 201M for magenta, a look-up table 202Ca for combining the separation data 201SP for the spot color with the separation data 201C for cyan, and a look-up table 202Ka for combining the separation data 201SP for the spot color with the separation data 201K for black, as illustrated in FIG. 10. In these look-up tables, for example, the horizontal axis represents the pixel value of a pixel of the spot color, and the vertical axis represents a value to be added to the pixel value of a pixel in the separation data to be combined. The look-up table for combining the separation data for the spot color with the separation data for the special color is an example of the special-color conversion table according to the exemplary embodiment of the present disclosure.

On the other hand, in the case where the arrangement position of the special-color toner obtained from the spot-color data is the foremost position, the controller 101 outputs a look-up table 202Yb for combining the separation data 201SP for the spot color with the separation data 201Y for yellow, a look-up table 202Mb for combining the separation data 201SP for the spot color with the separation data 201M for magenta, a look-up table 202Cb for combining the separation data 201SP for the spot color with the separation data 201C for cyan, a look-up table 202Kb for combining the separation data 201SP for the spot color with the separation data 201K for black, and a look-up table 202Sb for combining the separation data 201SP for the spot color with the separation data 201S1 for the special color, as illustrated in FIG. 11.

Depending on whether the arrangement position of the special-color toner obtained from the spot-color data is the backmost position on a recording medium or the foremost position on a recording medium, the relative position of the special-color toner layered with the basic-color toners differs, and therefore, the output look-up tables differ.

Next, the controller 101 combines the separation data 201SP for the spot color with each of the pieces of separation data for the basic colors and the separation data for the special color (step S27).

Specifically, in the case where the arrangement position of the special-color toner obtained from the spot-color data is the backmost position, the controller 101 obtains a value to be added to the pixel value of a pixel of the special color in the separation data 201S2 by referring to the look-up table 202Sa while using the pixel value of a pixel of the spot color in the separation data 201SP and adds the obtained value to the pixel value of a pixel of the special color in the separation data 201S2.

The controller 101 obtains a value to be added to the pixel value of a pixel of yellow in the separation data 201Y by referring to the look-up table 202Ya while using the pixel value of a pixel of the spot color in the separation data 201SP and adds the obtained value to the pixel value of a pixel of yellow in the separation data 201Y.

The controller 101 obtains a value to be added to the pixel value of a pixel of magenta in the separation data 201M by referring to the look-up table 202Ma while using the pixel value of a pixel of the spot color in the separation data 201SP and adds the obtained value to the pixel value of a pixel of magenta in the separation data 201M.

The controller 101 obtains a value to be added to the pixel value of a pixel of cyan in the separation data 201C by referring to the look-up table 202Ca while using the pixel value of a pixel of the spot color in the separation data 201SP and adds the obtained value to the pixel value of a pixel of cyan in the separation data 201C.

The controller 101 obtains a value to be added to the pixel value of a pixel of black in the separation data 201K by referring to the look-up table 202Ka while using the pixel value of a pixel of the spot color in the separation data 201SP and adds the obtained value to the pixel value of a pixel of black in the separation data 201K.

When the controller 101 adds the pixel value obtained from each of the look-up tables to the pixel value of each pixel in a corresponding one of the pieces of separation data for yellow, magenta, cyan, black, and the special color, the separation data for the spot color is combined with each of the pieces of separation data for the basic colors and the separation data for the special color. As a result, as illustrated in FIG. 10, separation data 203S2 for the special color, the separation data 203Y for yellow, the separation data 203M for magenta, the separation data 203C for cyan, and the separation data 203K for black used to draw the object of the spot color using the special color and the basic colors are generated.

On the other hand, in the case where the arrangement position of the special-color toner obtained from the spot-color data is the foremost position, the controller 101 obtains a value to be added to the pixel value of a pixel of the special color in the separation data 201S1 by referring to the look-up table 202Sb while using the pixel value of a pixel of the spot color in the separation data 201SP and adds the obtained value to the pixel value of a pixel of the special color in the separation data 201S1.

The controller 101 obtains a value to be added to the pixel value of a pixel of yellow in the separation data 201Y by referring to the look-up table 202Yb while using the pixel value of a pixel of the spot color in the separation data 201SP and adds the obtained value to the pixel value of a pixel of yellow in the separation data 201Y.

The controller 101 obtains a value to be added to the pixel value of a pixel of magenta in the separation data 201M by referring to the look-up table 202Mb while using the pixel value of a pixel of the spot color in the separation data 201SP and adds the obtained value to the pixel value of a pixel of magenta in the separation data 201M.

The controller 101 obtains a value to be added to the pixel value of a pixel of cyan in the separation data 201C by referring to the look-up table 202Cb while using the pixel value of a pixel of the spot color in the separation data 201SP and adds the obtained value to the pixel value of a pixel of cyan in the separation data 201C.

The controller 101 obtains a value to be added to the pixel value of a pixel of black in the separation data 201K by referring to the look-up table 202Kb while using the pixel value of a pixel of the spot color in the separation data 201SP and adds the obtained value to the pixel value of a pixel of black in the separation data 201K.

When the controller 101 adds the pixel value obtained from each of the look-up tables to the pixel value of each pixel in a corresponding one of the pieces of separation data for yellow, magenta, cyan, black, and the special color, the separation data for the spot color is combined with each of the pieces of separation data for the basic colors and the separation data for the special color. As a result, as illustrated in FIG. 11, separation data 203S1 for the special color, the separation data 203Y for yellow, the separation data 203M for magenta, the separation data 203C for cyan, and the separation data 203K for black used to draw the object of the spot color using the special color and the basic colors are generated.

Next, the controller 101 generates pieces of raster data from the pieces of separation data (step S28). Specifically, in the case where the arrangement position of the special-color toner obtained from the spot-color data is the backmost position, the controller 101 generates raster data 204S2 for the special color from the separation data 203S2, generates the raster data 204Y for yellow from the separation data 203Y, generates the raster data 204M for magenta from the separation data 203M, generates the raster data 204C for cyan from the separation data 203C, and generates the raster data 204K for black from the separation data 203K.

On the other hand, in the case where the arrangement position of the special-color toner obtained from the spot-color data is the foremost position, the controller 101 generates raster data 204S1 for the special color from the separation data 203S1, generates the raster data 204Y for yellow from the separation data 203Y, generates the raster data 204M for magenta from the separation data 203M, generates the raster data 204C for cyan from the separation data 203C, and generates the raster data 204K for black from the separation data 203K.

After completing generation of the pieces of raster data, the controller 101 feeds the generated pieces of raster data to the image forming part 20 (step S29). In the image forming part 20, the raster data 204S1 is fed to the optical scanning device 34S1, and the raster data 204S2 is fed to the optical scanning device 34S2.

In a case where the arrangement position of the special-color toner obtained from the spot-color data is "automatic", determination performed by the controller 101 results in NO in step S16. In the case where determination in step S16 results in NO, the controller 101 (obtaining unit 1002) communicates with the image forming part 20 and requests the image forming part 20 to obtain information indicating the type (color) of the toner used by the image forming unit 24S1 and information indicating the type (color) of the toner used by the image forming unit 24S2 (step S17). The positional relationship between the image forming units 24 that form basic-color toner images and the image forming units 24 that form special-color toner images are determined in advance. Therefore, with the obtained pieces of information, the order in which the basic-color toner images and the special-color toner images are transferred to the intermediate transfer belt 22 is known, and the positional relationship of each of the special-color toner images relative to the basic-color toner images regarding vertical layering is known.

The controller 101 uses the pieces of information obtained in step S17 to determine whether the type of the toner used by the image forming unit (image forming unit 24S1) that forms the foremost toner image on a recording medium matches the special-color-toner type included in the spot-color data (step S18).

In a case where the type of the toner used by the image forming unit (image forming unit 24S1) that forms the foremost toner image on a recording medium matches the special-color-toner type included in the spot-color data (YES in step S18), the controller 101 generates separation data for each of the basic colors, separation data for the special color, and separation data for the spot color so that the spot color is printed by using the basic-color toners and the special-color toner that is the foremost toner on a recording medium (step S23). Specifically, the controller 101 generates the separation data 201SP for the spot color, the separation data 201S1 for the special color, the separation data 201Y for yellow, the separation data 201M for magenta, the separation data 201C for cyan, and the separation data 201K for black, as illustrated in FIG. 11.

Next, the controller 101 (output unit 1003) outputs look-up tables so that the spot color is printed by using the basic-color toners and the special-color toner that is the foremost toner on a recording medium (step S24). Specifically, the controller 101 outputs the look-up table 202Sb, the look-up table 202Yb, the look-up table 202Mb, the look-up table 202Cb, and the look-up table 202Kb, as illustrated in FIG. 11.

Next, the controller 101 performs a process for combining the separation data 201SP for the spot color with each of the pieces of separation data 201Y, 201M, 201C, and 201K for the basic colors and the separation data 201S1 for the special color (step S27).

When the controller 101 adds the value obtained from each of the look-up tables to the pixel value of each pixel in a corresponding one of the pieces of separation data for yellow, magenta, cyan, black, and the special color, the separation data for the spot color is combined with each of the pieces of separation data for the basic colors and the separation data for the special color. As a result, as illustrated in FIG. 11, the separation data 203S1 for the special color, the separation data 203Y for yellow, the separation data 203M for magenta, the separation data 203C for cyan, and the separation data 203K for black used to draw the object of the spot color using the basic colors and the special color are generated.

Next, the controller 101 generates pieces of raster data from the pieces of separation data (step S28). Specifically, the controller 101 generates the raster data 204S1 for the special color, the raster data 204Y for yellow, the raster data 204M for magenta, the raster data 204C for cyan, and the raster data 204K for black, as illustrated in FIG. 11.

After completing generation of the pieces of raster data, the controller 101 feeds the generated pieces of raster data to the image forming part 20 (step S21). In the image forming part 20, the raster data 204S1 is fed to the optical scanning device 34S1.

In a case where the type of the toner used by the image forming unit (image forming unit 24S1) that forms the foremost toner image on a recording medium does not match the special-color-toner type included in the spot-color data (NO in step S18), the controller 101 uses the pieces of information obtained in step S17 to determine whether the type of the toner used by the image forming unit (image forming unit 24S2) that forms the backmost toner image on a recording medium matches the special-color-toner type included in the spot-color data (step S19).

In a case where the type of the toner used by the image forming unit (image forming unit 24S2) that forms the backmost toner image on a recording medium matches the special-color-toner type included in the spot-color data (YES in step S19), the controller 101 generates separation data for each of the basic colors, separation data for the special color, and separation data for the spot color so that the spot color is printed by using the basic-color toners and the special-color toner that is the backmost toner on a recording medium (step S25). Specifically, the controller 101 generates the separation data 201SP for the spot color, the separation data 201S2 for the special color, the separation data 201Y for yellow, the separation data 201M for magenta, the separation data 201C for cyan, and the separation data 201K for black, as illustrated in FIG. 10.

Next, the controller 101 (output unit 1003) outputs look-up tables so that the spot color is printed by using the basic-color toners and the special-color toner that is the backmost toner on a recording medium (step S26). Specifically, the controller 101 outputs the look-up table 202Sa, the look-up table 202Ya, the look-up table 202Ma, the look-up table 202Ca, and the look-up table 202Ka, as illustrated in FIG. 10.

Next, the controller 101 performs a process for combining the separation data 201SP for the spot color with each of the pieces of separation data 201Y, 201M, 201C, and 201K for the basic colors and the separation data 201S2 for the special color (step S27).

When the controller 101 adds the pixel value obtained from each of the look-up tables to the pixel value of each pixel in a corresponding one of the pieces of separation data for yellow, magenta, cyan, black, and the special color, the separation data for the spot color is combined with each of the pieces of separation data for the basic colors and the separation data for the special color. As a result, as illustrated in FIG. 10, the separation data 203S2 for the special color, the separation data 203Y for yellow, the separation data 203M for magenta, the separation data 203C for cyan, and the separation data 203K for black used to draw the object of the spot color using the basic colors and the special color are generated.

Next, the controller 101 generates pieces of raster data from the pieces of separation data (step S28). Specifically, the controller 101 generates the raster data 204S2 for the special color, the raster data 204Y for yellow, the raster data 204M for magenta, the raster data 204C for cyan, and the raster data 204K for black.

After completing generation of the pieces of raster data, the controller 101 feeds the generated pieces of raster data to the image forming part 20 (step S21). In the image forming part 20, the raster data 204S2 is fed to the optical scanning device 34S2.

In a case where the type of the toner used by the image forming unit (image forming unit 24S2) that forms the backmost toner image on a recording medium does not match the special-color-toner type included in the spot-color data (NO in step S19), the controller 101 performs an error process (step S20). The error process is a process for, for example, displaying, on the display device of the operation unit 17, the fact that the special-color toner that is used to emulate and print the spot color is not used in the image forming part 20.

Modifications

The exemplary embodiment of the present disclosure has been described above; however, the present disclosure is not limited to the above-described exemplary embodiment, and various modifications may be made. For example, the above-described exemplary embodiment may be modified as follows. The above-described exemplary embodiment may be combined with any of the following modifications.

In the image forming part 20, the toner used by the image forming unit 24S1 and the toner used by the image forming unit 24S2 may be toners of the same special color. The controller 101 obtains, from the image forming part 20, information indicating the type (color) of the toner used by the image forming unit 24S1 and information indicating the type (color) of the toner used by the image forming unit 24S2 in step S17. In a case where the controller 101 determines that the special-color-toner type included in the spot-color data, the type of the toner used by the image forming unit 24S1, and the type of the toner used by the image forming unit 24S2 are the same, the flow may proceed to step S23 so that the spot color is printed by using the basic colors and the special color that is the foremost color on a recording medium.

In this case, the flow may proceed to step S25 instead of step S23, and the controller 101 may perform control so that the spot color is printed by using the basic colors and the special color that is the backmost color on a recording medium.

The controller 101 obtains, from the image forming part 20, information indicating the type (color) of the toner used by the image forming unit 24S1 and information indicating the type (color) of the toner used by the image forming unit 24S2 in step S17. In the case where the controller 101 determines that the special-color-toner type included in the spot-color data, the type of the toner used by the image forming unit 24S1, and the type of the toner used by the image forming unit 24S2 are the same, the controller 101 may output pieces of separation data and look-up tables so that the spot color is printed by using both the special-color toner that is the foremost toner on a recording medium and the special-color toner that is the backmost toner on a recording medium and may generate pieces of raster data by using these pieces of separation data and look-up tables.

Figure 12:
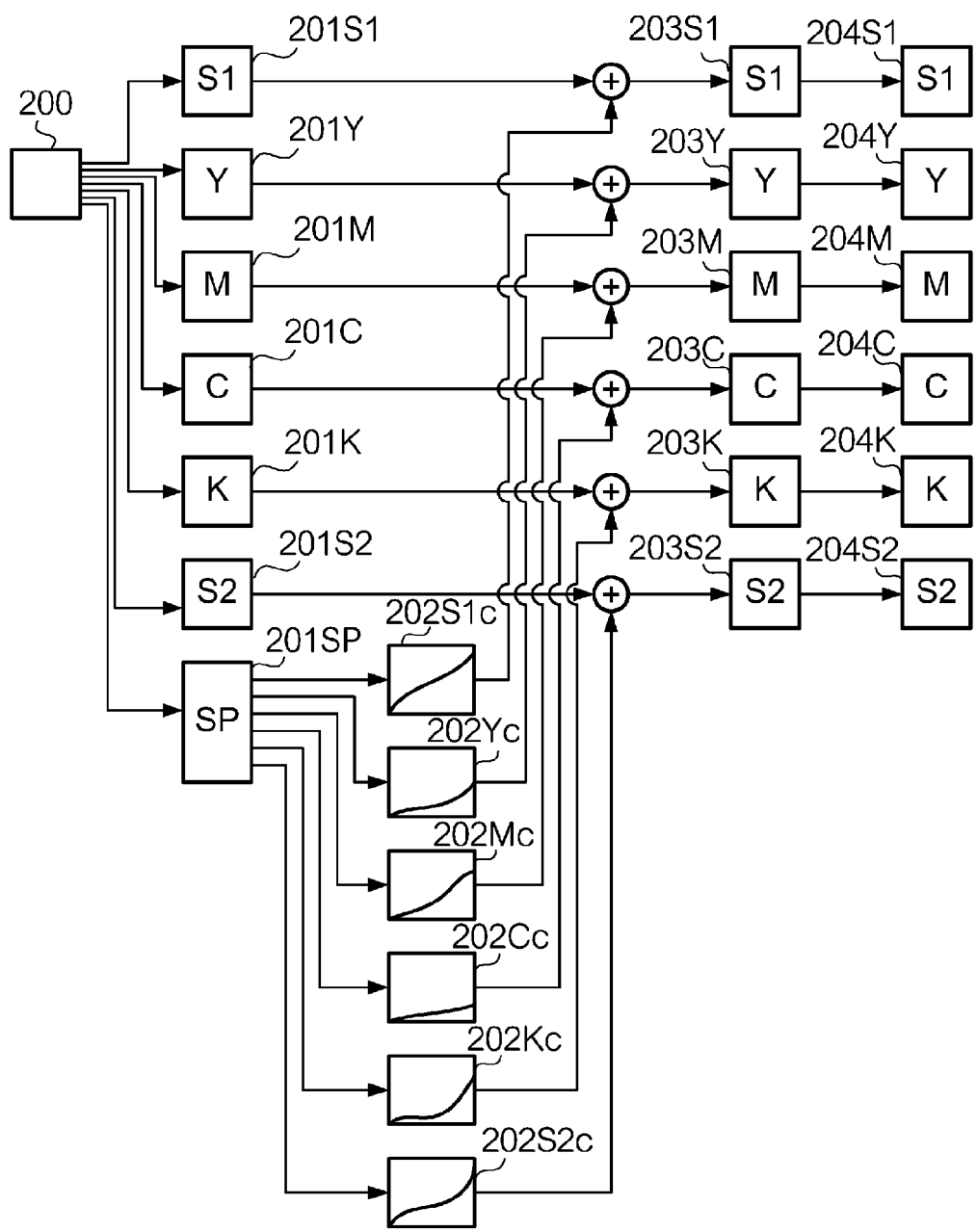
FIG. 12 is a diagram for describing an example operation according to a modification.

Specifically, the controller 101 generates, from the document data 200, the separation data 201S1 for the special color used by the image forming unit 24S1 that forms the foremost toner image on a recording medium, the separation data 201S2 for the special color used by the image forming unit 24S2 that forms the backmost toner image on a recording medium, the separation data 201Y for a yellow separation, the separation data 201M for a magenta separation, the separation data 201C for a cyan separation, the separation data 201K for a black separation, and the separation data 201SP for a spot-color separation, as illustrated in FIG. 12.

Next, the controller 101 outputs look-up tables for combining the separation data for the spot color with each of the pieces of separation data for the basic colors and each of the pieces of separation data for the special color by using CMYK values included in the spot-color data. Specifically, the controller 101 outputs a look-up table 202S1c for combining the separation data 201SP for the spot color with the separation data 201S1 for the special color, a look-up table 202S2c for combining the separation data 201SP for the spot color with the separation data 201S2 for the special color, a look-up table 202Yc for combining the separation data 201SP for the spot color with the separation data 201Y for yellow, a look-up table 202Mc for combining the separation data 201SP for the spot color with the separation data 201M for magenta, a look-up table 202Cc for combining the separation data 201SP for the spot color with the separation data 201C for cyan, and a look-up table 202Kc for combining the separation data 201SP for the spot color with the separation data 201K for black.

Next, the controller 101 combines the separation data 201SP for the spot color with each of the pieces of separation data for the basic colors and each of the pieces of separation data for the special color.

Specifically, the controller 101 obtains a value to be added to the pixel value of a pixel of the special color in the separation data 201S1 by referring to the look-up table 202S1c while using the pixel value of a pixel of the spot color in the separation data 201SP and adds the obtained value to the pixel value of a pixel of the special color in the separation data 201S1.

The controller 101 obtains a value to be added to the pixel value of a pixel of the special color in the separation data 201S2 by referring to the look-up table 202S2c while using the pixel value of a pixel of the spot color in the separation data 201SP and adds the obtained value to the pixel value of a pixel of the special color in the separation data 201S2.

The controller 101 obtains a value to be added to the pixel value of a pixel of yellow in the separation data 201Y by referring to the look-up table 202Yc while using the pixel value of a pixel of the spot color in the separation data 201SP and adds the obtained value to the pixel value of a pixel of yellow in the separation data 201Y.

The controller 101 obtains a value to be added to the pixel value of a pixel of magenta in the separation data 201M by referring to the look-up table 202Mc while using the pixel value of a pixel of the spot color in the separation data 201SP and adds the obtained value to the pixel value of a pixel of magenta in the separation data 201M.

The controller 101 obtains a value to be added to the pixel value of a pixel of cyan in the separation data 201C by referring to the look-up table 202Cc while using the pixel value of a pixel of the spot color in the separation data 201SP and adds the obtained value to the pixel value of a pixel of cyan in the separation data 201C.

The controller 101 obtains a value to be added to the pixel value of a pixel of black in the separation data 201K by referring to the look-up table 202Kc while using the pixel value of a pixel of the spot color in the separation data 201SP and adds the obtained value to the pixel value of a pixel of black in the separation data 201K.

When the controller 101 adds the pixel value obtained from each of the look-up tables to the pixel value of each pixel in a corresponding one of the pieces of separation data for yellow, magenta, cyan, black, and the special color, the separation data for the spot color is combined with each of the pieces of separation data for the basic colors and each of the pieces of separation data for the special color. As a result, as illustrated in FIG. 12, the separation data 203S1 for the special color, the separation data 203S2 for the special color, the separation data 203Y for yellow, the separation data 203M for magenta, the separation data 203C for cyan, and the separation data 203K for black used to draw the object of the spot color using the basic colors and the special color are generated.

Next, the controller 101 generates pieces of raster data from the pieces of separation data. Specifically, the controller 101 generates the raster data 204S1 for the special color from the separation data 203S1, generates the raster data 204S2 for the special color from the separation data 203S2, generates the raster data 204Y for yellow from the separation data 203Y, generates the raster data 204M for magenta from the separation data 203M, generates the raster data 204C for cyan from the separation data 203C, and generates the raster data 204K for black from the separation data 203K. After completing generation of the pieces of raster data, the controller 101 feeds the generated pieces of raster data to the image forming part 20. According to this modification, the special-color toner is arranged in the backmost position and the foremost position, resulting in the special color deeper than the color printed in a case where the special-color toner is arranged only in the backmost position or the foremost position.

In the case where the special-color-toner type included in the spot-color data, the type of the toner used by the image forming unit 24S1, and the type of the toner used by the image forming unit 24S2 are the same, the special-color toner in which arrangement position is to be used may be set for each spot color.

For example, after obtaining the pieces of information in step S17, the controller 101 may change the process to be performed depending on the spot color such that the flow proceeds to step S23 in accordance with a predetermined setting for a spot color A or the flow proceeds to step S25 in accordance with a predetermined setting for a spot color B. For a spot color C, as described above, the controller 101 may output pieces of separation data and look-up tables so that the spot color is printed by using both the special-color toner that is the foremost toner on a recording medium and the special-color toner that is the backmost toner on a recording medium and the basic-color toners and may use these pieces of separation data and look-up tables to generate pieces of raster data.

In the exemplary embodiment of the present disclosure, when the controller 101 obtains, from the image forming part 20, information indicating the type (color) of the toner used by the image forming unit 24S1 and information indicating the type (color) of the toner used by the image forming unit 24S2, the controller 101 makes a request for these pieces of information to the image forming part 20; however, this configuration is not restrictive. For example, the image forming part 20 may transmit, to the image processing apparatus 12 from the image forming part 20, information indicating the type (color) of the toner used by the image forming unit 24S1 and information indicating the type (color) of the toner used by the image forming unit 24S2 at predetermined intervals, and the controller 101 may store these pieces of information transmitted from the image forming part 20 at the predetermined intervals in the storage unit 102. In a case of this configuration, in the process in step S17, the controller 101 obtains the pieces of information stored in the storage unit 102. Also in this configuration, the controller 101 obtains, from the image forming part 20, information indicating the type (color) of the toner used by the image forming unit 24S1 and information indicating the type (color) of the toner used by the image forming unit 24S2.

The image forming part 20 according to the above-described exemplary embodiment forms an image on a recording medium by using an electrophotographic system; however, a configuration may be employed in which the image forming part 20 forms an image on a recording medium by using other systems, such as an inkjet system.

In a modification of the present disclosure, the image processing apparatus 12 and the image forming apparatus 14 may be integrated into an image forming apparatus.

In a modification of the present disclosure, the name of a spot color obtained from document data, pieces of information obtained in step S17, and look-up tables output on the basis of spot-color data and the pieces of information obtained in step S17 may be registered in the storage unit 102 in association with one another. In a case of this configuration, for example, when the controller 101 outputs pieces of raster data from document data, the controller 101 obtains the name of the spot color of a spot-color object included in the document data and obtains, from the image forming part 20, information indicating the type (color) of the toner used by the image forming unit 24S1 and information indicating the type (color) of the toner used by the image forming unit 24S2. In a case where a set of a name and pieces of information the same as the obtained name of the spot color and the pieces of information obtained from the image forming part 20 is registered in the storage unit 102, the controller 101 may output look-up tables registered in association with the obtained name of the spot color and combine the separation data for the spot color with each of the pieces of separation data for the basic colors and the separation data for the special color.

The functions implemented by the controller 101 of the image processing apparatus 12 according to the exemplary embodiment or modifications described above may be implemented as one or more hardware circuits, implemented by an arithmetic unit executing one or more programs, or implemented as a combination thereof. In a case where the functions of the controller 101 are implemented by using a program, the program may be stored in a computer-readable recording medium, such as a magnetic recording medium (for example, a magnetic tape or a magnetic disk (a hard disk drive (HDD) or a flexible disk (FD)), an optical recording medium (for example, an optical disk), a magneto-optical recording medium, or a semiconductor memory, and provided, or the program may be distributed via a communication line.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A color conversion apparatus comprising:
   an obtaining unit that obtains information indicating a positional relationship between basic-color toners of basic colors and a special-color toner of a special color among special-color toners of special colors regarding vertical layering on an image formed in an image forming apparatus using the basic-color toners and the special-color toner;
   a defining unit that defines a spot color by a combination of the basic colors and the special color; and
   an output unit that outputs, in accordance with the positional relationship indicated by the information, basic-color conversion tables used to convert the spot color to the basic colors that are included in the combination and a special-color conversion table used to convert the spot color to the special color that is included in the combination.

2. The color conversion apparatus according to claim 1, wherein
   in a case where a special-color toner, among the special-color toners, that lies over the basic-color toners and a special-color toner, among the special-color toners, that lies under the basic-color toners have the same color, the output unit outputs the basic-color conversion tables and the special-color conversion table in accordance with a predetermined setting.

3. The color conversion apparatus according to claim 2, wherein
   the output unit outputs the basic-color conversion tables and special-color conversion tables so that the spot color is output by the image forming apparatus using both the special-color toner that lies over the basic-color toners and the special-color toner that lies under the basic-color toners.

4. The color conversion apparatus according to claim 2, wherein
   the output unit outputs the basic-color conversion tables and the special-color conversion table in accordance with a positional relationship between the basic colors and the special color, the positional relationship being set in advance for the spot color.

5. The color conversion apparatus according to claim 1, wherein
   in a case where the special-color toner that is used to form an image in the image forming apparatus has a color different from the special color that is used to define the spot color by the definition unit, the output unit does not generate the basic-color conversion tables and the special-color conversion table.

6. The color conversion apparatus according to claim 5, further comprising
   a notification unit that makes a notification that the special-color toner used to form an image in the image forming apparatus has a color different from the special color used to define the spot color by the definition unit.

7. A non-transitory computer readable medium storing a program causing a computer to execute a process for color conversion, the process comprising:
   obtaining information indicating a positional relationship between basic-color toners of basic colors and a special-color toner of a special color among special-color toners of special colors regarding vertical layering on an image formed in an image forming apparatus using the basic-color toners and the special-color toner;
   defining a spot color by a combination of the basic colors and the special color; and
   outputting, in accordance with the positional relationship indicated by the information, basic-color conversion tables used to convert the spot color to the basic colors that are included in the combination and a special-color conversion table used to convert the spot color to the special color that is included in the combination.

8. An image forming apparatus comprising:
   first image forming units that form toner images using basic-color toners of basic colors;
   second image forming units that form toner images using special-color toners of special colors;
   a transfer unit that layers and transfers, to a recording medium, the toner images formed by the first image forming units and the toner images formed by the second image forming units;
   an obtaining unit that obtains information indicating a positional relationship between the basic-color toners and a special-color toner of a special color among the special-color toners regarding vertical layering on an image formed using the basic-color toners and the special-color toner;

a defining unit that defines a spot color by a combination of the basic colors and the special color; and an output unit that outputs, in accordance with the positional relationship indicated by the information, basic-color conversion tables used to convert the spot color to the basic colors that are included in the combination and a special-color conversion table used to convert the spot color to the special color that is included in the combination.

\* \* \* \* \*